(12) United States Patent
Sellars (10) Patent No.: US 6,324,220 B1
(45) Date of Patent: Nov. 27, 2001

(54) STABILIZED PRECODER FOR DATA TRANSMISSION

(75) Inventor: Malcolm Paul Sellars, Cambridge (GB)

(73) Assignee: Adaptive Broadband Ltd., Cambridge (GB)

( * ) Notice: Subject to any disclaimer, the term of this patent is extended or adjusted under 35 U.S.C. 154(b) by 0 days.

(21) Appl. No.: 09/506,381

(22) Filed: Feb. 18, 2000

(30) Foreign Application Priority Data

Feb. 19, 1999 (GB) .................................................... 9903920

(51) Int. Cl.$^7$ ............................. H04K 1/02; H04L 25/03; H04L 25/49
(52) U.S. Cl. ............................. 375/296; 375/233; 455/62
(58) Field of Search ..................................... 375/229, 226, 375/219, 221, 232, 230, 233; 455/561, 507, 63, 65; 381/103, 98; 333/28 R, 28 T (56) References Cited

U.S. PATENT DOCUMENTS

| | | |
|---|---|---|
| 4,701,936 | 10/1987 | Clark et al. . |
| 5,282,222 * | 1/1994 | Fattouche et al. .................... 375/260 |
| 5,881,108 * | 3/1999 | Herzberg et al. ..................... 375/296 |
| 6,097,762 * | 8/2000 | Suzuki et al. ......................... 375/259 |
| 6,124,997 * | 9/2000 | Hirasaka ................................. 360/65 |

FOREIGN PATENT DOCUMENTS

| | | |
|---|---|---|
| 0 549 019 A2 | 12/1992 | (EP) . |
| WO 98/39871 | 9/1998 | (WO) . |
| WO 99/05807 | 2/1999 | (WO) . |

OTHER PUBLICATIONS

Malcolm P. Sellars, et al., *Stabilized Precorder With Antenna Diversity for Wireless Lans*, IEEE, (Aug. 9, 1999), pp. 1169–1175.

* cited by examiner

*Primary Examiner*—Chi Pham
*Assistant Examiner*—Phuong Phu
(74) *Attorney, Agent, or Firm*—Finnegan, Henderson, Farabow, Garrett & Dunner, L.L.P.

(57) ABSTRACT

A precoding scheme for digital data transmission across multipath channels is described, which improves on existing methods of precoder stability. This precoding scheme uses radial reduction of unstable roots to stabilize the precoder. Furthermore, in a broadband access system in which the preceding scheme is used, all of the precoding and equalization is performed in the subscriber units. This eliminates the problems of equalization and training delays occuring at the base station, thus allowing rapid demodulation of data arriving at the base station for several disparate subscriber terminals units.

27 Claims, 6 Drawing Sheets

STABILIZED PRECODER FOR DATA TRANSMISSION

TECHNICAL FIELD

The present invention from a first aspect relates to a stabilization technique for precoders of the type used in data communications systems. In particular, the present invention is concerned with stabilizing the precoder in a robust manner by operating upon the transfer function of the precoder filter.

Furthermore, from a second aspect the present invention relates to a point-multipoint data communications system wherein data equalization and precoding is performed in the subscriber terminals.

BACKGROUND OF THE INVENTION

In radio communications systems, the transmitted signal travels from transmitter to receiver over a channel consisting of a number of different paths, known as multipaths. The transmitted signal component travelling along a particular path experiences absorption, reflection or scattering by any objects located along that path This causes the signal components arriving at the receiver to have different amplitudes, phases and delays so that they interred with one another. This interference is known as multipath fading, and results in Intersymbol Interference (ISI) at baseband. ISI describes the spreading out of the data symbols so that components of past and future symbols are superimposed on the current symbol, thus increasing the difficulty of symbol detection and causing symbol errors.

An equalizer is often used at the receiver to remove ISI caused by the channel, by effectively applying the inverse of the channel impulse response to the received data symbols. Such an operation removes the effects of the channel from the received data. IN order to operate correctly, the equalizer requires a known preamble (or training sequence) to be transmitted together with each burst (or packet) of data symbols. The channel characteristics are then calculated from the received training data and used to adapt the equalizer to remove the channel effects from the subsequent burst or packet of data symbols. A decision feedback equalizer (DFE) is an example of a type of equalizer commonly used in radio communication systems since it is able to deal with channels having spectral nulls.

The construction of a decision feedback equalizer is shown in our International Patent Application No. PCT/GB99/01801, the necessary elements of which are incorporated herein by reference and to which the reader is referred for. further details.

Equalization while reducing ISI, also has a number of disadvantages. More particularly, equalization using a training sequence or preamble introduces an overhead in data rate, since the preamble uses up symbols which could otherwise he been used to carry data. Equalization also introduces an overbead in packet delay, since the equalizer requires a certain period of time to train itself to the channel with the help of the preamble. A separate equalizer is often required at both terminals (base station and subscriber terminal), which means that the equalization overhead is present on both the downlink (base station, to subscriber terminal transmission) and on the uplink (subscriber terminal to base station transmission). In a point-multipoint system with many subscriber terminals accessing a single base station and using a Time Division Multiple Access TDMA) channel access scheme for the uplink, the equalizer at the base station will be required to re-train for each burst received form a different subscriber terminal. This means that delays for re-training will be frequent, and will reduce the overall data rate.

PRIOR ART

Point-to-multipoint systems may use time-division duplex (TDD) operation so as to make the most efficient use of the channel under the asymetric data rate requirements of the subscriber terminals and base station. The TDD mode of operation allows the use of precoding of the data to be transmitted, as described in GB 2262867.

More particularly, GB 2262867 discloses a pre-equalization technique wherein an automatic equalizer in the receiver of a digital communications system is adjusted using a training sequence. The equalizer coefficients for optimum adjustment are then transmitted back to the transmitter and supplied to an equalizer provided therein. After the training period is over, this transmitter equalizer, now having adjusted coefficients is activated and the receiver equalizer is disabled CA 2153641 further discloses a variant of the above-described operation wherein the equalization and pre-equalization load is shared asymetrically between the respective transmitter and receiver.

Figure 1:
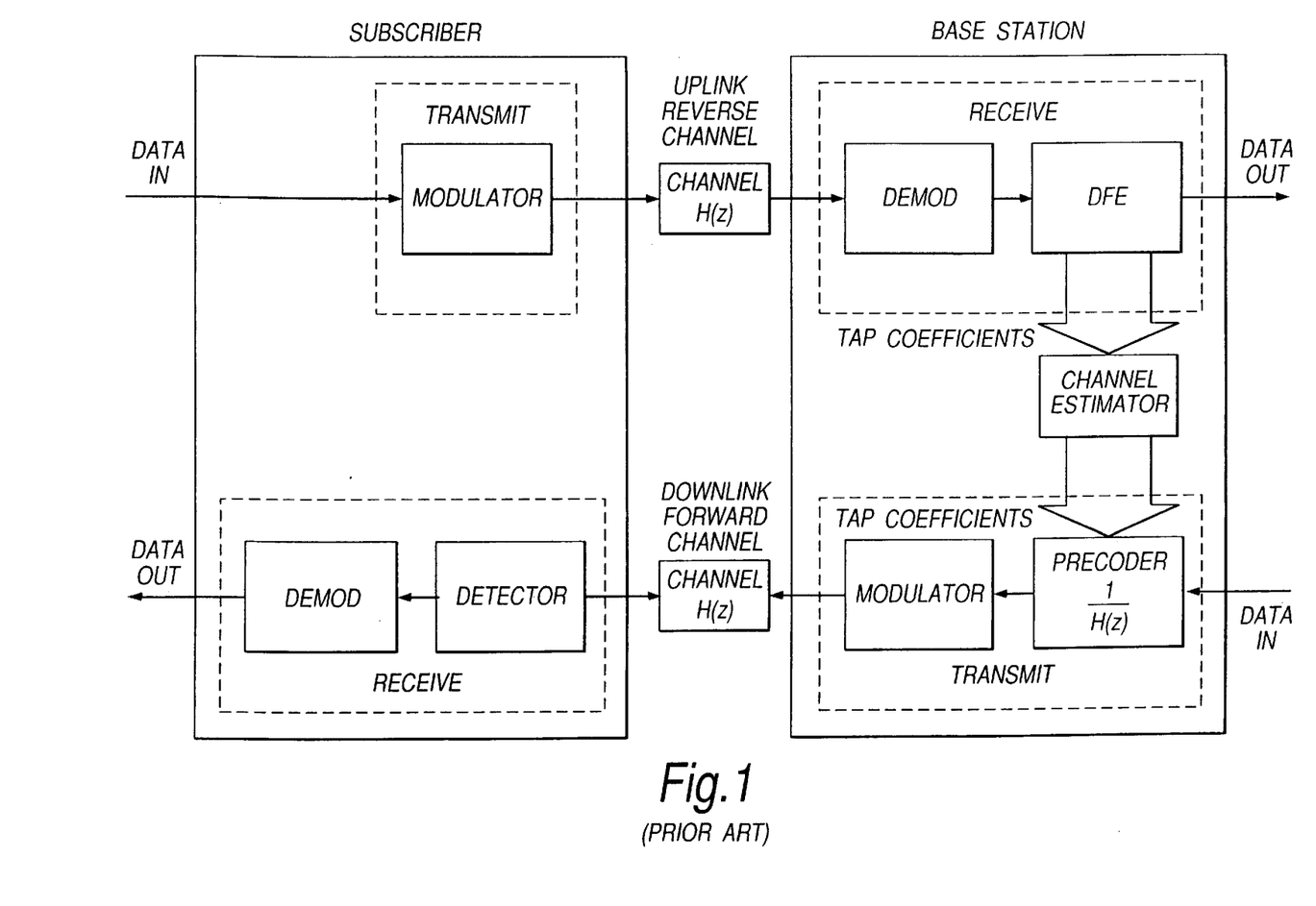
FIG. 1 shows a block diagram of a prior art communications system with the equer and precoder located at the Base Station.

The underlying assumption for the use of precoding is the reciprocity of the channel impulse response, since TDD entais 2-way transmission on the same carrier frequency. Thus the downlink channel and uplink channel are assumed to have the same impulse response, provided that the interval between downlink and uplink transmissions is short. A recent trend in radio systems is the aim to make simpler and cheaper subscriber terminals by moving the equalization load to the base station. A prior art system with the equalizer and precoder located in the base station terminal is shown in FIG. 1.

The term precoding is used to describe pre-equalization performed at the transmitter prior to transmission of the data. The precoder requires knowledge of the channel impulse response $H(z)$. This may be estimated from the converged taps of the equalizer on the forward link. Ideally, the transfer function of the precoder should be the inverse of the channel transfer function. When the fading channel is not minimum-phase, a non-linear operation is needed to ensure stability of the precoder.

Figure 2:
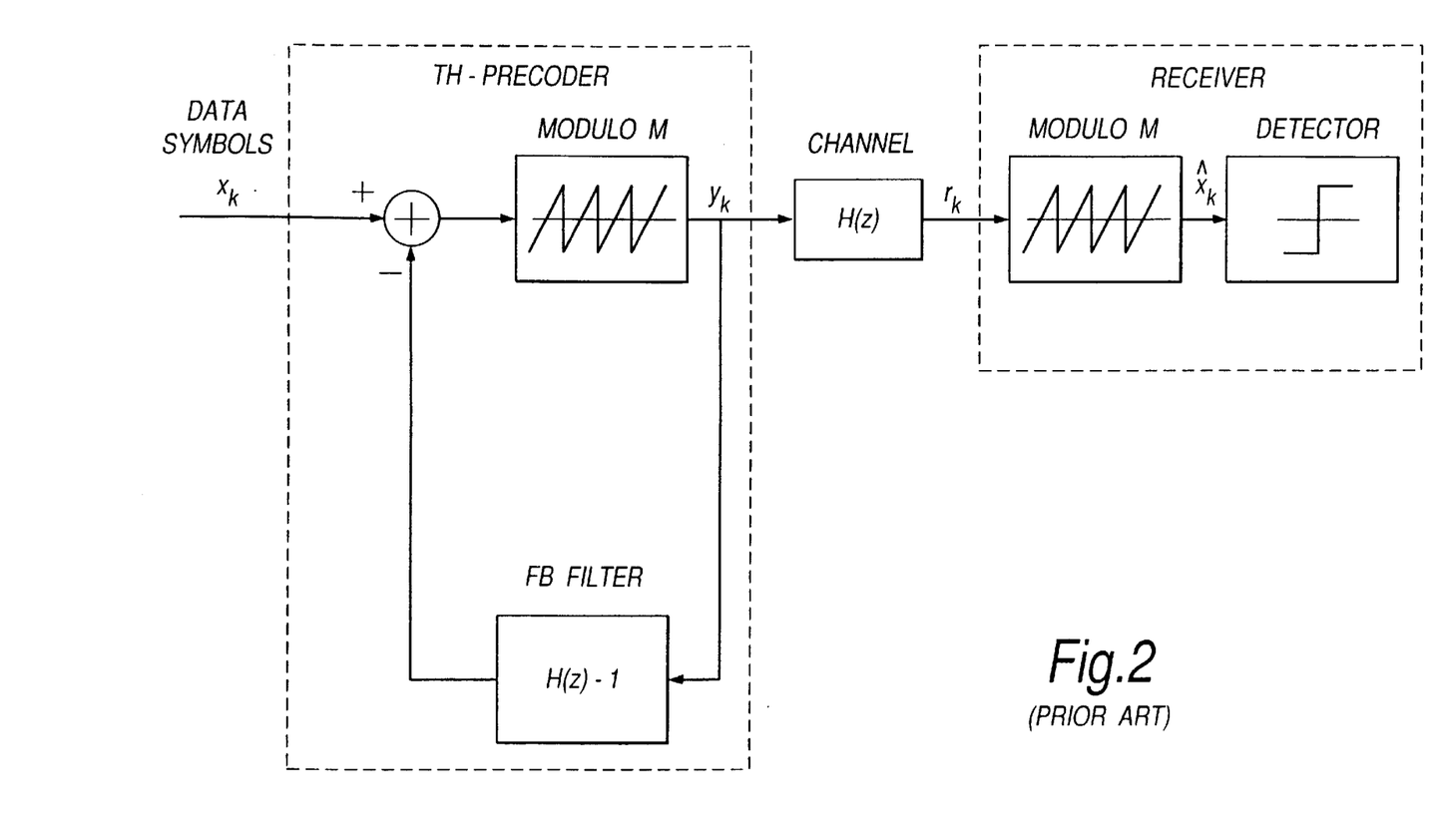
FIG. 2 shows a block diagram of a typical Tomlinson-Harashima precoder of the prior art.

A prior art method of precoding is Tomlinson-Harashima precoding (TH precoding), which uses a modulo operator block at both the transmitter and receiver. ATH precoding system is shown in FIG. 2. The output of the modulo M block always has a magnitude in the range $-M/2$ to $+M/2$, and this ensures stability of the precoder.

However, there are a number of practical difficuties with the modulo block used in TH precoding. In particular, the signal amplitude at the receiver is distorted, and this causes the automatic gain control (AGC) level to vary due to signal level fluctuations. Further, the dynamic range of the received signal is increased, and therefore the number of useful quantizer levels at the receiver is reduced. The anti-alias filters at the receiver will also require increased dynamic range.

In addition, the use of TH precoding introduces the need for synchronization between modulo blocks at the transmitter and receiver. Without synchronisation the receiver has difficulty in distinguishing between 'spikes' (due to transmit modulo operations) and noise, so causing modulo errors.

Furthermore, as TH precoding is highly sensitive to noise on the channel, it is highly unsuitable for use with wireless channels. Previous uses of TH precoding have been limited to wired channels only.

SUMMARY OF THE INVENTION

As mentioned earlier, previous point-to-multipoint subscriber systems aimed to make simpler subscriber terminals by moving the equalization load to the base station. In one aspect of the present invention, however, the aim is to transfer as much of the equalization load as possible to the subscriber terminals, so reducing the re-training delays at the base station This will also allow length reduction of training sequences on the uplink, increasing efficiency in the use of the channel. In another aspect, the present invention aims to provide a precoder which allows for stabilization of the inverse channel impulse response by modification of the precoder filter transfer functions as appropriate. By providing such stabilization then at least some of the drawbacks of the Tomlinson-Harashima method of precoding as described above can be overcome.

In addition, the present invention has been developed in the context of a wireless point-to-multipoint networking infrastructure which is capable of supporting multimedia data traffic at high bit rates in local and wide areas, but the invention could also be used with other networking infrastructures, and in particular with a wired network.

According to a first aspect of the present invention, there is provided a precoder for pre-equalize data to be transmitted over a channel comprising:

a feedback filter loop including a feedback filter having a feedback transfer function, said loop arranged to receive from an input the data to be transmitted and to partially pre-equalize said data; and a feedforward filter having a feedforward transfer function, said feedforward filter arranged to receive said partially pre-equalized data from the feedback filter loop and to output substantially pre-equalized data onto the channel;

wherein said feedback filter loop further includes means for modifying the feedback transfer function to maintain the stability of the feedback filter thereby stabilizing the feedback loop.

The means for modifying the feedback transfer function may comprise stability monitor means and stability control means. The stability monitor means detect the stability of the partially pre-equalized data and signal the stability control means that an instability is about to occur, whereby the stability control means modify the feedback transfer function in such a manner as to maintain the stability of the precoder.

The stability control means can further comprise feedback filter coefficient calculation and storage means arranged to calculate and store a replacement set of feedback filter coefficients corresponding to a stable precoder response and feedback filter coefficient switching means arranged to supply the feedback filter with the replacement set of feedback filter coefficients stored in said coefficient calculation and storage means in response to a signal from the stability monitor means that the precoder is becoming unstable. Such operation ensures that the feedback filter coefficients used in the feedback filter are controlled to ensure that the precoder remains stable.

According to another aspect of the present invention there is provided a method of precoding for pre-equalizing input data to be transmitted on a channel, comprising the steps of:

i) partially pre-equalizing the input data in a feedback filter loop having a feedback transfer function; and ii) substantially pre-equalizing the partially pre-equalized data, in a feedforward filter;

wherein the partially pre-equalizing step further includes the step of modifying the feedback transfer function to maintain the stability of the feedback filter loop.

The step of modifying the feedback transfer fiction can further include the steps of monitoring the stability of the partially pre-equalized data and controlling the feedback transfer function when it is detected that the partially equalized data is becoming unstable.

The controlling step can further comprise the steps calculating and storing a replacement set of feedback filter coefficients corresponding to a stable precoding response; and supplying the feedback filter with the replacement set of feedback filter coefficients in response to the stability of the partially pre-equalized data; such that the feedback filter coefficients used in the feedback filter are controlled to ensure that the precoding stable.

According to a third aspect of the present invention there is provided, a point-to-multipoint data communications system providing for time division duplex operation over a channel between a base station and at least one subscriber terminal characterized in that the subscriber terminal includes:

an equalizer arranged to substantially remove any interference introduced by the channel into any received data; and precoding means for pre-equalizing data to be transmitted over the channel to the base station;

said data communication and precoding is system being filter characterised in that all data equalization and precoding is performed in said at least one subscriber terminal.

In an embodiment of the data communications system of the present invention there is further provided a channel estimator means for estimating the channel response from the received data, the precoding means being responsive to the estimated channel response so as to control the pre-equalization accordingly.

The channel estimator means may further generate filter tap coefficients for use in the precoding means. When the equalizer is a decision feedback equalizer, the filter tap coefficients can be taken direct from the filter taps of the DFE, or alternatively may be radially scaled in the channel estimator means to ensure stability of the precoding means.

From a further aspect, the present invention also provides a wireless data communications method providing for time division duplex operation over a channel between a base station and at least one subscriber terminal comprising the steps of:

equalizing received data at the subscriber terminal to substantially remove any interference introduced therein by the channel; and pre-equalizing data to be transmitted over the channel to the base station;

wherein said equalizing and pre-equalizing steps are each performed by said at least one subscriber terminal.

The present invention therefore presents a data communications system where an equalizer and precoder are located in each of the subscriber terminals thus eliminating the need for preceding and equalization at the base station, The data communications system may utilise ATM (Asynchronous Transfer Mode). Moreover, the subscriber terminals may be fixed or mobile. Furthermore, the present invention may find application in both wired and wireless systems.

In addition, the present invention also presents a stabilized precoder, which allows us to use an inverse filter for the channel but without the use of modulo operations to ensure stability. Instead, precoder stability is achieved by pulling only critical zeros further inside the unit circle on the z-plane.

Alternatively, the stabilized precoder of the present invention may radially scale all zeros to insure that critical zeros are pulled inside the unit-circle.

The present invention has the advantage that effective precoding and equalization may be performed in the subscriber teals only, thus reducing, equalization overheads at the base station, and thereby allowing for an improvement in spectral efficiency on the uplink to the base station.

There is a further advantage that precoder stability is achieved without the use of modulo operations. Once stability has been achieved no non-linearities operate in the system.

In addition, both the stabilized precoder and associated method of preceding of the present invention are each of greater practical significance than the TH precoding method of the prior art. In particular, the precoding method of is the present invention is more generally applicable and hence far more flexible than TH precoding. Furthermore, the precoder of the present invention is better suited to wireless channels, as it is less sensitive to added noise in the channel. This can result in improved automatic gain control at the receiver, and hence a more stable received signal level.

BRIEF DESCRIPTION OF THE DRAWINGS

A preferred embodiment of the invention will now be described in detail by way of example, and with reference to the accompanying drawings, in which.

DESCRIPTION OF THE SPECIFIC EMBODIMENTS

Figure 3:
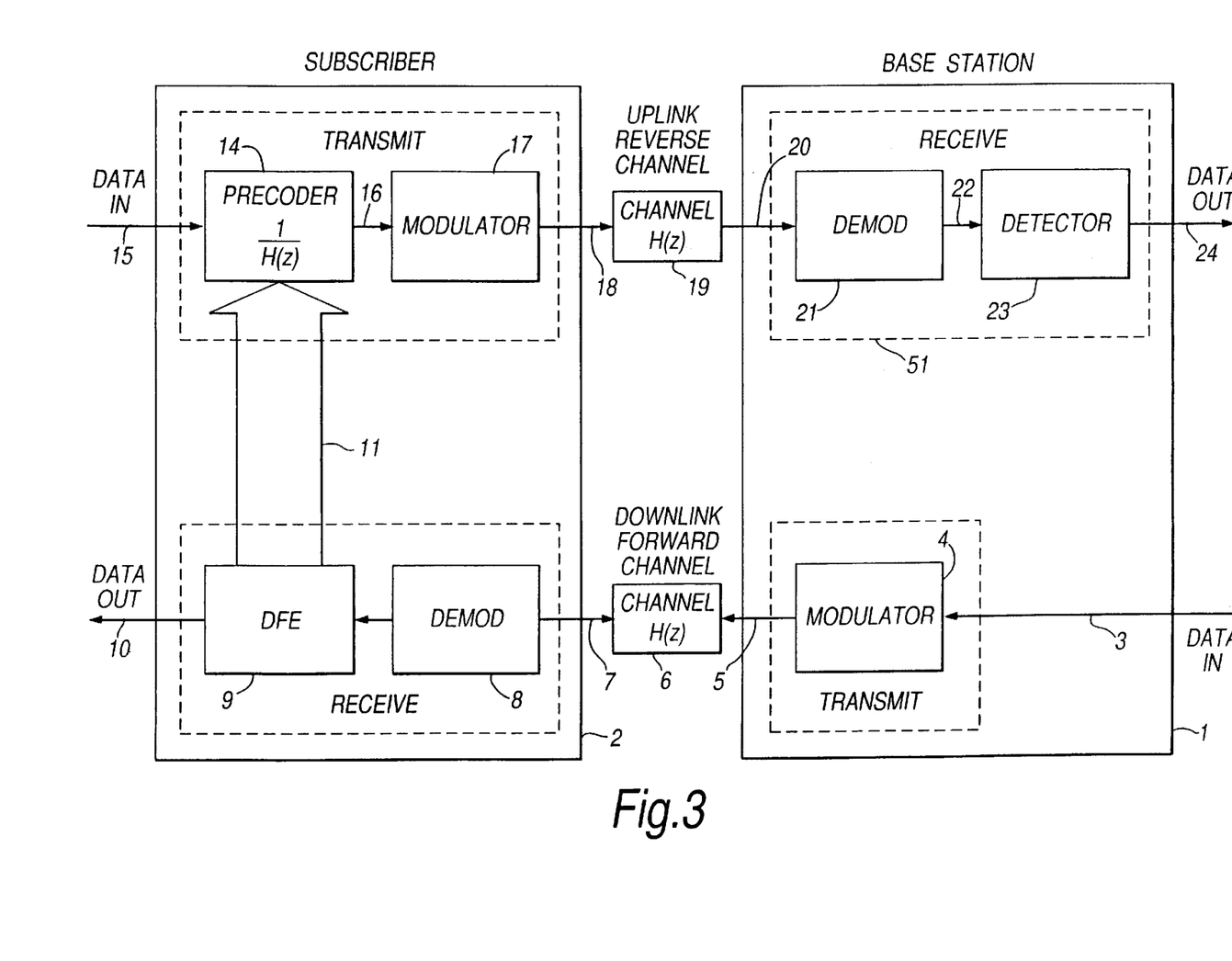
FIG. 3 shows a block diagram of a communications system in an embodiment of the present invention where both the equalizer and precoder are located at the subscriber terminal.

A communications system according to a first embodiment of the present invention with the equalizer and precoder located in the subscriber terminal is shown in FIG. 3.

On the downlink the base station (1) transmits data to the subscriber terminal (2). Data symbols (3) are input to the base station transmitter, where they pass into a modulator (4). The modulator converts the data into a radio signal for transmission (5). This radio signal is transmitted over the downlink channel (6), and arrives as a distorted signal (7) at the subscriber (2). At the subscriber, the received signal (7) is demodulated by a demodulator (8), and then passed into a decision feedback equalizer (DFE) (9). The DFE removes any ISI from the signal and outputs a set of data symbols (10). At the end of a received data burst, the channel characteristics (11) measured by the DFE in the form of the DFE feedforward (FF) and feedback (FB) filter coefficients $B=[b_1, b_2, \ldots, b_p]$. may be passed directly into the precoder (14) as the filter coefficients of the respective feedforward and feedback filters provided therein. In this respect, and as will become more apparent later, the precoder (14) comprises a feedforward filter, and a feedback filter which may be in operation and construction identical to the feedforward and feedback filters provided in the DFE. However, in contrast with the DFE of the prior a the order of the two filters is reversed with respect to the DFE. That is, within the precoder of the present invention the feedback filter precedes the feedforward filter, whereas in the DFE the opposite is true, ie. the feedforward filter precedes the feedback filter, However, this symmetrical construction allows the converged filter coefficients from the DFE to be loaded directly into the precoder filter taps without any alteration, and for the channel impulse response found by the DFE to be inversely applied to the data by the precoder.

Figure 4:
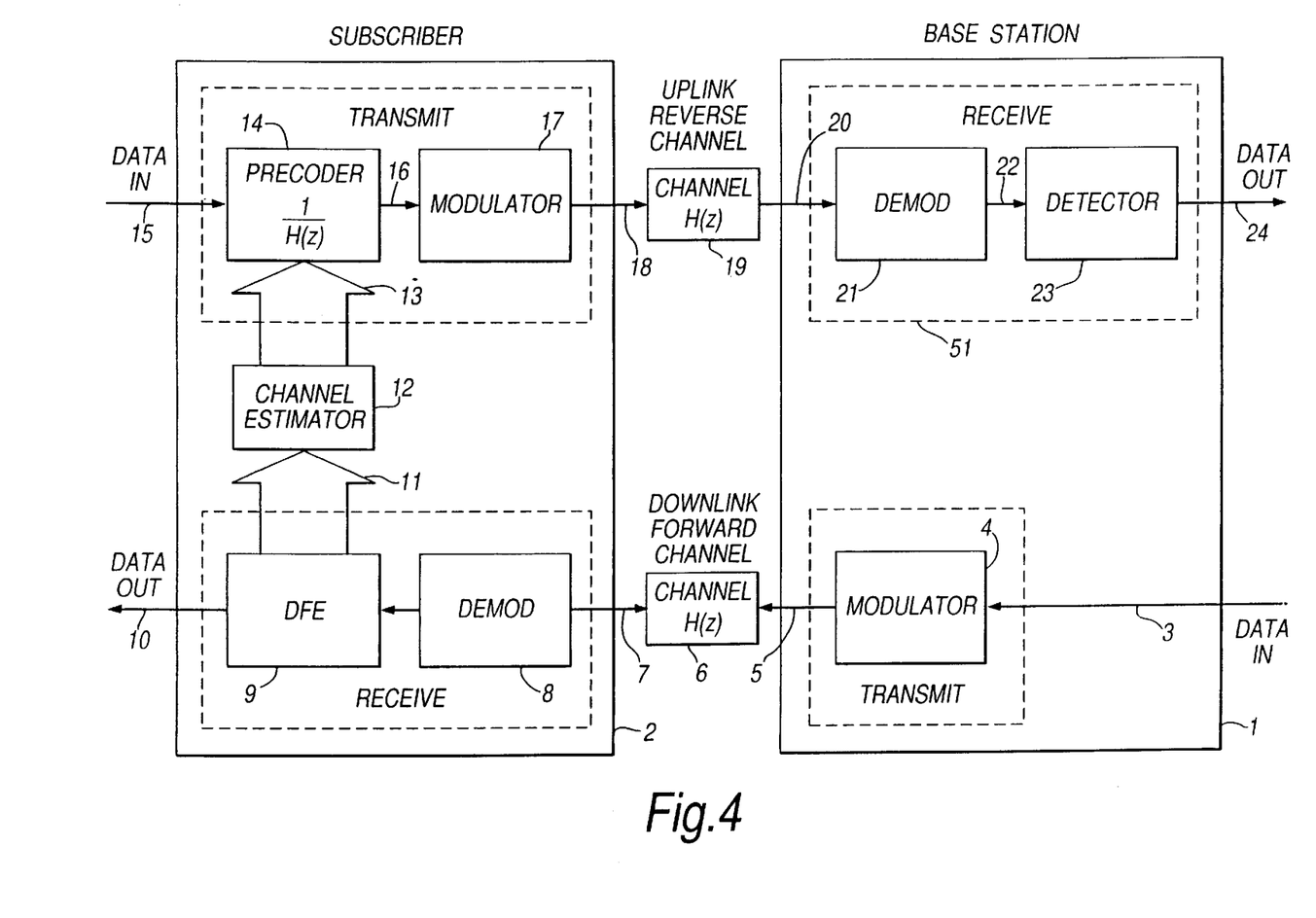
FIG. 4 shows a block diagram of another embodiment of a communications system of the invention when both the equalizer and precoder are located at the subscriber terminal.

An alternative embodiment of the data communications system according to the present invention is shown in FIG. 4. This embodiment has in common all the features of the embodiment of FIG. 3, but further includes a channel estimator block (12) into which the DFE filter coefficients are passed. The channel estimator generates a first set of tap coefficients $B=[b_1, b_2, \ldots, b_p]$. which are transferred into the taps of the precoder. The tap coefficients may be the filter tap coefficients taken direct from the DFE or may alternatively be adjusted to compensate for any instabilities or non-linearities in the DFE response. A preferred method of adjusted is to radially scale the roots of the filter transfer functions so that all zeroes lie within the unit circle on the z-plane, and to then generate the precoder filter tap coefficients from the modified transfer function, as is described in detail later. Other methods of mathematically adjusting the filter tap coefficients will also be apparent to those skilled in the art which may find application within the present invention.

Data symbols (15) which are to be transmitted from the subscriber terminal to the base station, are passed through the precoder (14), to produce a stream of data samples (16) which have been precoded (or, alternatively, pre-equalized) with the inverse or approximate inverse of the channel impulse response H(z) (6). The stream of precoded data samples (16) is passed through a modulator (17) to produce a radio signal (18) for transmission over the uplink channel (19). It is assumed that the uplink channel (19) has an identical channel impulse response H(z) to the downlink channel (6). After transmission over the uplink channel (19), the radio signal (20) which amves at the base station is completely free from multipath interference, since it has already been precoded (pre-equalized) before transmission. This means that no further equalization is required at the base station (1). At the base station, the received signal (20) is passed into a demodulator (21), which outputs a stream of data samples (22) which are free from intersymbol interference (ISI) due to the precoding. Since there is no ISI, the data samples (22) may be detected by a simple detector (23), without any equalization. In this configuration, the base station (1) does not require any equalizer, since the subscriber terminals (2) all use precoding on the uplink. In a network where many subscribers communicate with a single base station, this eliminates the problem of equalization and training delays at the base station.

An embodiment of the precoder of the present invention located at a subscriber terminal will now be described with reference to FIG. 4. The converged feedforward (FF) and feedback (EB) filter taps from the DFE (9) are loaded directly into the precoder FF (63) and FB (62) filters respectively. Investigation of these taps reveals that the FB filter (62) has a transfer function $1/H_B(z)$ where $H_B(z)=B(z)+1$, which is made up of:

1. Zeros inside the unit circle on the z-plane (i.e. stable zeros); and
2. Zeros close to the boundary of the unit circle, both inside and outside (i.e. critical zeros).

Figure 5:
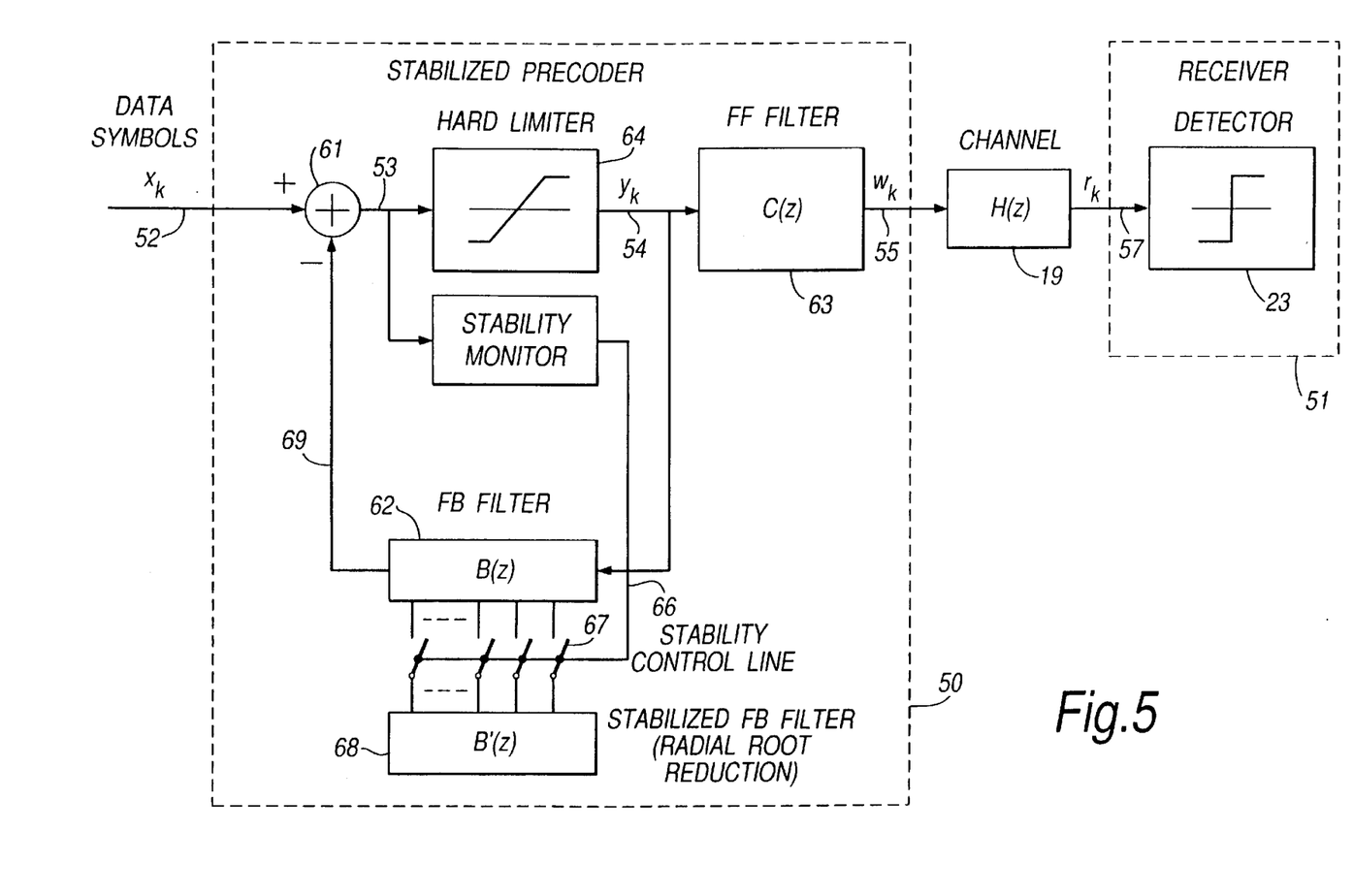
FIG. 5 shows a block diagram of a stabilized precoder according to another embodiment of the present invention.
Figure 6:
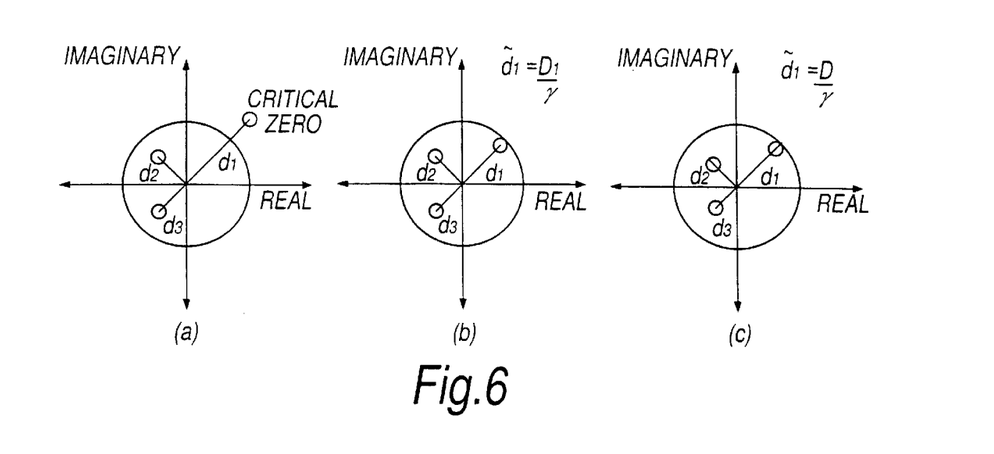
FIG. 6 shows three diagrams of the z-plane illustrating the stabilization method of the present invention.

An example plot of FB filter zero positions is shown in FIG. 5(a) where the zeroes are roots of the polynomial $H_B(z)$.

The FF filter has transfer function C(z), with all zeros inside the unit circle. The overall precoder transfer function $A(z)=C(z)/H_B(z)=C(z)/(1+B(z))=1H(z)$, where H(z) is the channel transfer function. Precoder stabilization is required due to critical zeros in the transfer function $H_B(z)$ of the feedback filter (62).

We modify the precoder as follows: instead of a modulo operator at the precoder, we use a hard limiter (64) since the transmit power must always be bounded. Data symbols (52) to be transmitted from the subscriber terminal (2) to the base station (1) are input to the stabilized precoder (50). These data symbols pass into a summer (61), where the output samples (69) from the FB filter (62) are subtracted, to form a partially precoded signal (53), which is passed through the hard limiter (64). The partially precoded signal also passes into a stability monitor block (65) (this may be a simple threshold detector). If the stability monitor block (65) detects the onset of an unstable signal, it sends a control signal via the stability control line (66) to activate a set of switches (67), which enable the transfer of a new set of coefficients $B'=[b'_1, b'_2, \ldots, b'_p]$ from a coefficient store (68) into the FB filter (62) in place of the original coefficients $B[b_1, b_2, \ldots, b_p]$. These new coefficients have zeros which have been pulled further inside the unit circle to ensure stability. The hard limiter (64) has output $Y_k$ (54) which is passed through the FF filter (63), which outputs a precoded signal $w_k$ (55). The precoded signal (55) is transmitted over the uplink channel (19). The received signal (57) at the base station receiver (51) is free from ISI, and so requires only a simple detector (23) instead of a full equalizer. If the stability monitor block (65) in the precoder was activated, then the received signal (57) will contain a small amount of ISI due to the radial root reduction in the stabilized precoder (50). However, this small amount of ISI is an acceptable price to pay for the advantages gained from avoiding the use of modulo operations.

A description of the calculation of the new set of FB filter tap coefficients $B'=[b'_1, b'_2, \ldots, b'_p]$ according to the present invention will now be undertaken.

The new set of FB filter tap coefficients B' may be calculated from the original DFE FB taps using radial scaling of the roots. The channel equalization is no longer exact, but this is a trade-off between equalization accuracy and stability. However, since the critical zeros of the FB filter are always located in close proximity to the unit circle, only a small amount of radial reduction is required. Two methods of radial scaling may be employed within the present invention, each of which will be described with reference to FIG. 5.

A first method for radial scaling is to perform root finding operations, on the polynomial $H_B(z)$ to find the locations of all zeros. Critical zeros, being those roots near to the boundary of the unit circle on either side as shown in FIG. 5(a), are then selected and reduced by a scaling factor sufficient to pull them a small distance inside the unit circle, whilst zeros already inside the unit circle remain unchanged. The new polynomial $H'_B(z)$ is then reconstituted using convolution of the zeros. This results in reasonably accurate equalization, but requires some processing time for root finding. For example, if the FB section of the precoder has a transfer function $1/H_B(z)$ where:

$$\text{FB filter: } H_B(z) = B(z) + 1 = [h_0 + h_1 z^{-1} + h_2 z^{-2} + \ldots + h_p z^{-p}]$$
$$= (1 - \alpha_1 z^{-1})(1 - \beta_2 z^{-1})(1 - \beta_3 z^{-1})$$

then applying the fit method of scaling to only critical zeroes results in a stabilized FB filter with transfer function:

$$H'_B(z) = B'(z) + 1$$
$$= (1 - (\alpha_1/\gamma)z^{-1})(1 - \beta_2 z^{-1})(1 - \beta_3 z^{-1})$$

where: $\alpha_1$ is a critical root, and $|\alpha_1/\gamma|<1$;
$d_1=|\alpha_1|$;
$\beta_2$ and $\beta_3$ are stable roots inside the unit circle; and
$d_2=|\beta_2|$ and $d_3=|\beta_3|$.

The scaling value of $1/\gamma$ should generally be only slightly smaller than 1 ($1/\gamma=0.9$ was found to give reasonable results). This is because the converged FB filter taps of a DFE, (which are used for the precoder FB filter taps), have all zeros either inside, or slightly outside, the nt circle in the z-plane. Radial scaling of only critical roots is shown in FIG. 5(b).

A second method of radial scaling is to scale all the zeroes by an appropriate scaling factor. Radial scaling of all zeros by a factor of $1/\gamma$ is efficiently implemented by multiplying each tap coefficient $b_k$ by a scalar constant $1/\gamma^k$. The second method has the advantage that no root finding is required, but the equalization performance is slightly degraded when compared to the first method. Radial scaling of all the roots is illustrated in FIG. 5(c).

Applying the second method results in a new FB filter which has transfer function $1/H'_B(z)$ where:

$$H'_B(z) = H_B(\gamma z)$$
$$= [\gamma^p h_0 + \gamma^{p-1} h_1 z^{-1} + \ldots + \gamma h_{(p-1)} z^{-(p-1)} + h_p z^{-p}]$$

The new set of FB taps is:

$$B(z) = [(1/\gamma)h_1 z^{-1} + \ldots + (1/\gamma^{p-1})h_{(p-1)} z^{-(p-1)} + (1/\gamma^p)h_p z^{-p}]$$
$$= [(1/\gamma)b_1 z^{-1} + \ldots + (1/\gamma^{p-1})b_{(p-1)} z^{-(p-1)} + (1/\gamma^p)b_p z^{-p}]$$

For example, if the precoder FB section has transfer function:

$$H_B(z) = B(z) + 1$$
$$= (1 - \alpha_1 z^{-1})(1 - \beta_2 z^{-1})(1 - \beta_3 z^{-1})$$

then the stabilized transfer function becomes:

$$H'_B(z) = B'(z) + 1$$
$$= (1 - (\alpha_1/\gamma)z^{-1})(1 - (\beta_2/\gamma)z^{-1})(1 - (\beta_3/\gamma)z^{-1})$$

Figure 7:
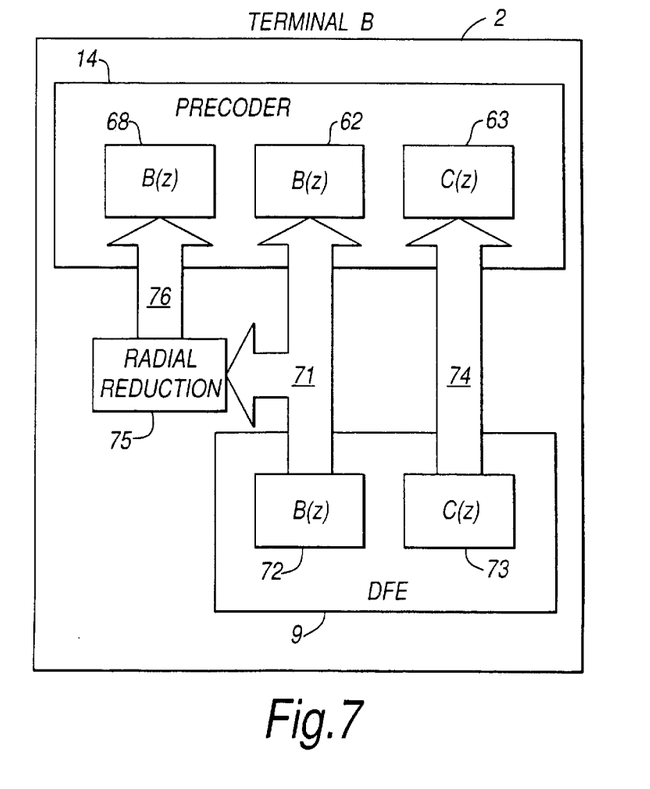
FIG. 7 shows a block diagram illustrating the initialisation of the filter coefficients in the precoder of the present invention.

The precoder PF filter (63) and FB filter (62) are initialised as shown in FIG. 7. At the end of a received data burst, the tap coefficients (74) from the DFE FF filter (73) are loaded directly into the precoder FF filter (63). The tap coefficients (71) from the DFE FB filter (72) are loaded directly into the precoder FB filter (62). The FB tap coefficients (71) are also passed into a radial root reduction block (75), where they are used to calculate stabilized FB filter tap coefficients (76) in a manner described above, which are then passed into the coefficient store (68).

The advantage of he Stabilized Precoding method is that it does not require modulo operations at the transmitter and receiver, so avoiding errors due to false or missed modulo activations. Also, by continuously monitoring the stability of the precoder the present invention provides that although a particular channel impulse response may have a critical zero (and so be potentially unstable), the root reduction will not be activated unless the precoder output actually starts to go unstable. For a short data block a potentially unstable precoder may in fact remain stable with a particular data sequence. In this case, the stabilized precoder allows operation wit the true inverse filter for as long as the output remains stable.

For a broadband access system where many subscriber terminals pass streams of data to or from the base station, equalization and precoding at the subscriber terminals will greatly reduce the base station's equalization load, and allow the use of greatly reduced training sequences, thus increasing spectral efficiency. Indeed, where it is possible to determine optimum symbol detection for best demodulation by other means, such as, for example in synchronous data communications, or where optimum symbol detection is not an issue then use of both an equalize and precoder at the subscriber terminal may completely remove the requirement for an upstream preamble.

What is claimed is:

1. A precoder for pre-equalizing data to be transmitted over a channel, comprising:
    a feedback filter loop including a feedback filter having a feedback transfer function, said loop arranged to receive from an input the data to be transmitted and to partially pre-equalize said data; and
    a feedforward filter having a feedforward transfer function, said feedforward filter arranged to receive said partially pre-equalized data from the feedback filter loop and to output substantially pre-equalized data onto the channel;
    wherein said feedback filter loop further includes means for modifying the feedback transfer function to maintain the stability of the feedback filter thereby stabilizing the feedback filter loop.

2. A precoder according to claim 1, wherein said means for modifying the feedback transfer function comprise stability monitor means arranged to detect the stability of the partially pre-equalized data and stability control means arranged to modify the feedback transfer function when the stability monitor means indicate that the partially pre-equalized data is becoming unstable.

3. A precoder according to claim 2 wherein the stability control means comprise;
    feedback filter coefficient calculation and storage means arranged to calculate and store a replacement set of feedback filter coefficients corresponding to a stable precoder response; and
    feedback filter coefficient switching means arranged to supply the feedback filter with the replacement set of feedback filter coefficients stored in said coefficient calculation and storage means in response to a signal from the stability monitor means that the precoder is becoming unstable;
    whereby the feedback filter coefficients used in the feedback filter are controlled to ensure that the precoder remains stable.

4. A precoder according to any of the preceding claims wherein the feedback filter loop further includes summation means arranged to sum the output of the feedback filter with the input data to produce the partially pre-equalized data.

5. A precoder according to claim 4, wherein the feedback filter loop further comprises a limiter arranged to receive the output of the summation means, and to limit the signal energy of the received data to within predetermined boundaries.

6. A precoder according to claim 5 wherein the feedback filter receives the output of the limiter as an input.

7. A precoder according to claim 2, wherein the stability monitor means is a threshold detector.

8. A precoder according to claim 3, wherein the feedback filter coefficient calculation and storage means calculates the replacement set of feedback filter coefficients so that each root of the feedback filter transfer function when represented graphically on a plot of the z-domain lies within a circle of unit radius centred on the origin of said plot.

9. A precoder according to claim 8, wherein the replacement set of feedback filter coefficients are calculated by radially scaling said roots about the origin of said plot.

10. A precoder according to claim 9, wherein all roots are scaled radially about said origin.

11. A precoder according to claim 9, wherein only unstable roots are scaled radially about said origin.

12. A method of precoding for pre-equalizing input data to be transmitted on a channel, comprising the steps of:
    i) partially pre-equalizing the input data in a feedback filter loop having a feedback transfer function; and
    ii) substantially pre-equalizing the partially pre-equalized data in a feedforward filter,
    wherein the partially pre-equalizing step further includes the step of modifying the feedback transfer function to maintain the stability of the feedback filter loop.

13. A method of precoding according to claim 12, wherein the steps of modifying the feedback transfer function further comprises the steps of monitoring the stability of the partially pre-equalized data and modifying the feedback transfer function when it is detected that the partially pre-equalized data is becoming unstable.

14. A method of stabilized precoding according to claim 13, wherein the step of modifying the feedback transfer function comprises the steps of:
    a) calculating and storing a replacement set of feedback filter coefficients corresponding to a stable precoding response; and
    b) supplying a feedback filter with the replacement set of feedback filter coefficients in response to the stability of the partially pre-equalized data;
    whereby the feedback filter coefficients used in the feedback filter are controlled to ensure at the precoding remains stable.

15. A method according to claim 12, wherein the partially pre-equalizing step i) further includes the step of summing the input data with the output of the feedback to produce the partially pre-equalized data.

16. A method of precoding according to claim 12, wherein the partially pre-equalizing step i) further comprises the step of limiting the signal energy for the partially pre-equalized data to within predetermined boundaries.

17. A method of precoding according to any of claims 12 to 16 wherein the calculating and storing step a) is further characterized by calculating the replacement set of feedback filter coefficients so that each root of the feedback filter transfer function when represented graphically on a plot of the z-domain lies within a circle of unit radius centred on the origin of said plot.

18. A method according to claim 17, wherein the replacement set of feedback filter coefficients are calculated by radially scaling the roots about the origin of said plot.

19. A method according to claim 18, wherein all roots are scaled radially about said origin.

20. A precoder according to claim 18 wherein only unstable roots are scaled radially about said origin.

21. A wireless data communications system providing for time division duplex operation over a channel between a base station and at least one subscriber terminal characterized in that the subscriber terminal includes:

an equalizer arranged to substantially remove any interference introduced by the channel into any received data; and preceding means for pre-equalizing data to be transmitted over the channel to the base station, the preceding means comprising:

a feedback filter loop including a feedback filter having a feedback transfer function, said loop arranged to receive from an input the data to be transmitted and to partially pre-equalize said data, and means for modifying the feedback transfer function to maintain the stability of the feedback filter thereby stabilizing the feedback filter loop; and a feedforward filter having a feedforward transfer function, said feedforward filter arranged to receive said partially pre-equalized data from the feedback filter loop and output substantially pre-equalized data onto the channel;

whereby said data communications system is further characterized in that all data equalization and precoding is performed in the subscriber terminal.

22. A wireless data communication system according to claim 21, and further comprising:

channel estimator means for estimating the channel response from the received wherein said preceding means is responsive to an estimated channel response from said channel estimator means, and pre-equalizes the data to be transmitted using the estimated channel response.

23. A wireless data communication system according to claim 21, wherein the equalizer is a decision feedback equalizer.

24. A wireless data communications system according to claim 21, wherein the data is transmitted on the channel using ATM.

25. A wireless data communications method providing for time division duplex operation over a channel between a base station and at least one subscriber terminal comprising the steps of:

equalizing received data at the subscriber terminal to substantially remove any interference introduced therein by the channel; and pre-equalizing data to be transmitted over the channel to the base station, the step of pre-equalizing further comprises:

partially pre-equalizing the input data in a feedback filter loop having a feedback transfer function, the step of partially pre-equalizing including modifying the feedback transfer function to maintain the stability of the feedback filter loop, and substantially pre-equalizing the partially pre-equalized data in a feedforward filter, wherein said equalizing and pre-equalizing steps are each performed by said at least one subscriber terminal.

26. A wireless data communications method according to claim 25, comprising the steps of:

estimating the channel response from the received data;

wherein said data to be transmitted is pre-equalized using the estimated channel response.

27. A wireless data communications method according to claim 25, wherein the data is transmitted on the channel using ATM.

* * * * *

UNITED STATES PATENT AND TRADEMARK OFFICE
CERTIFICATE OF CORRECTION

PATENT NO. : 6,324,220 B1  Page 1 of 1
DATED : November 27, 2001
INVENTOR(S) : Malcolm Paul Sellars It is certified that error appears in the above-identified patent and that said Letters Patent is hereby corrected as shown below:

Column 9, claim 3,
Line 57, "comprise;" should read -- comprise: --.

Column 11, claim 21,
Line 20, "preceding" should read -- precoding --;
Line 33, "and output" should read -- and to output --.

Column 11, claim 22,
Line 42, "response from the received" should read -- response from the received data --;

Column 12, claim 22,
Line 1, "preceding" should read -- precoding --.

Signed and Sealed this

Twenty-sixth Day of March, 2002

Attest:

*Attesting Officer*

JAMES E. ROGAN
*Director of the United States Patent and Trademark Office*